(12) United States Patent
Siegel

(10) Patent No.: US 8,560,370 B2
(45) Date of Patent: Oct. 15, 2013

(54) METHODS, SYSTEMS, AND COMPUTER PRODUCTS FOR ADDING MAP COMPONENT TO ADDRESS BOOK

(75) Inventor: Laurence Siegel, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 726 days.

(21) Appl. No.: 12/171,062

(22) Filed: Jul. 10, 2008

(65) Prior Publication Data

US 2010/0010736 A1 Jan. 14, 2010

(51) Int. Cl.
*G06Q 10/00* (2012.01)

(52) U.S. Cl.
USPC ...................................... 705/7.18; 455/456.1

(58) Field of Classification Search
USPC .......................... 705/8, 10, 7.18; 701/211, 208
See application file for complete search history.

(56) References Cited

U.S. PATENT DOCUMENTS

| | | | |
|---|---|---|---|
| 6,349,299 B1 * | 2/2002 | Spencer et al. ................ | 707/702 |
| 6,956,942 B2 * | 10/2005 | McKinzie et al. ......... | 379/355.04 |
| 7,440,445 B1 * | 10/2008 | Croak et al. ................... | 370/352 |
| 7,689,595 B2 * | 3/2010 | Boss et al. .............. | 707/999.107 |
| 2003/0069874 A1 * | 4/2003 | Hertzog et al. ..................... | 707/1 |
| 2003/0158837 A1 * | 8/2003 | Suzuki et al. ...................... | 707/1 |
| 2004/0177096 A1 * | 9/2004 | Eyal et al. .................. | 707/104.1 |
| 2005/0015316 A1 * | 1/2005 | Salluzzo ......................... | 705/30 |
| 2005/0114021 A1 * | 5/2005 | Krull et al. ..................... | 701/211 |
| 2005/0243381 A1 * | 11/2005 | Hill et al. ....................... | 358/453 |
| 2005/0287997 A1 * | 12/2005 | Fournier ....................... | 455/415 |
| 2007/0135136 A1 * | 6/2007 | Ische .......................... | 455/456.1 |
| 2007/0178915 A1 * | 8/2007 | Khan ............................ | 455/457 |
| 2007/0229538 A1 * | 10/2007 | Klassen et al. ................ | 345/629 |
| 2007/0256026 A1 * | 11/2007 | Klassen et al. ................ | 715/764 |
| 2007/0259654 A1 * | 11/2007 | Oijer ............................. | 455/415 |
| 2008/0086455 A1 * | 4/2008 | Meisels et al. .................... | 707/3 |
| 2008/0104630 A1 * | 5/2008 | Bruce et al. ..................... | 725/31 |
| 2008/0109718 A1 * | 5/2008 | Narayanaswami ........... | 715/262 |
| 2008/0280600 A1 * | 11/2008 | Zhou ............................. | 455/415 |
| 2009/0005981 A1 * | 1/2009 | Forstall et al. ................ | 701/211 |
| 2009/0076902 A1 * | 3/2009 | Grinsted et al. ................ | 705/14 |
| 2009/0157732 A1 * | 6/2009 | Hao et al. ...................... | 707/102 |
| 2009/0177513 A1 * | 7/2009 | Eckhart et al. .................... | 705/8 |

OTHER PUBLICATIONS

Pharos Science & Applications, "Smart Navigator", Internet reference: http://www.pharosgps.com/products/services/smartnavigator.htm; retrieved on Apr. 30, 2007, p. 1.

Mac, "Mac Tips Daily! #137—Map Address Book Contacts", Internet reference: http://www.thinkmac.net/blog/archives/mac-tips-daily-137-map-address-book-contacts.html; retrieved on May 3, 2007, pp. 1-3.

Versiontracker; "Google Maps Plugin—2.6.3 Google Maps plugin for Address", Internet reference: http://www.versiontracker.com/dyn/moreinfo/macrosx/27003; retrieved on May 3, 2007, pp. 1-4.

* cited by examiner

*Primary Examiner* — Brian Epstein
(74) *Attorney, Agent, or Firm* — Cantor Colburn LLP

(57) ABSTRACT

Methods, systems, and computer products for adding a map component to an address book which include initiating an address book, adding a map component to the address book that corresponds to an entry of the address book, and providing the map component.

10 Claims, 6 Drawing Sheets

METHODS, SYSTEMS, AND COMPUTER PRODUCTS FOR ADDING MAP COMPONENT TO ADDRESS BOOK

BACKGROUND

Exemplary embodiments relate generally to address books, and more particularly, to including map components in address books.

Typically, an address book is implemented in software using a database for storing entries called contacts. Each contact entry usually consists of a few standard fields (for example, first name, last name, company name, address, telephone number, e-mail address, fax number, and mobile phone number). A personal information manager (PIM) integrates an address book, calendar, task list, and sometimes other features.

Entries can be imported and exported from the software in order to transfer them between programs or computers. The common file formats for these operations are LDIF (*.ldif, *.di); Tab delimited (*.tab, *.txt); Comma separated (*.csv); and vCard (*.vcf). Individual entries are frequently transferred as vCards (*.vcf), which are roughly comparable to physical business cards, and some software applications can handle a vCard file containing multiple vCard records.

Although the information in an address book is helpful, it would be useful to integrate additional components into the address book.

BRIEF SUMMARY

Exemplary embodiments include a method of adding a map component to an address book which includes initiating an address book, adding a map component to the address book that corresponds to an entry of the address book, and providing the map component.

Additional exemplary embodiments include a computer program product, tangibly embodied on a computer readable medium, for adding a map component to an address book. The computer program product includes instructions for causing a computer to execute a method, which includes initiating an address book, adding a map component to the address book that corresponds to an entry of the address book, and providing the map component.

Further exemplary embodiments include a communication device for adding a map component. The communication device includes an input and output device for respectively receiving and transmitting communications over a network, a display screen, and a processor functionally coupled to memory. The processor is responsive to computer-executable instructions and operative to initiate an address book, to display the address book on the display screen, to access a map component, and to add the map component to the address book such that the map component corresponds to an entry of the address book.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
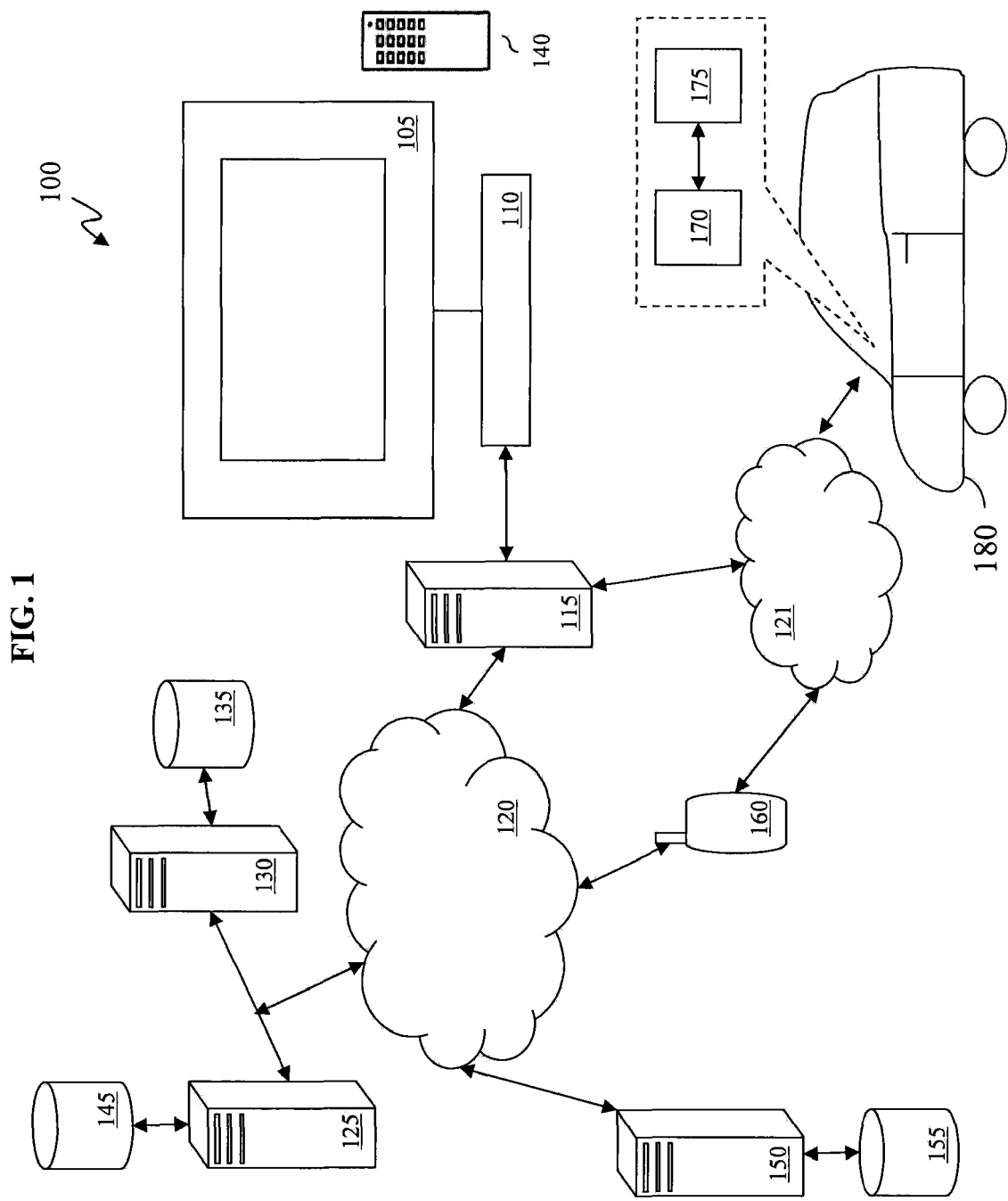
FIG. 1 illustrates a block diagram of networks/systems in accordance with exemplary embodiments.

FIG. 1 illustrates a block diagram of networks/systems 100 in accordance with exemplary embodiments. The networks/systems 100 provide an infrastructure through which users can access media (including video, audio, data, multimedia messaging, address books) through a communications device 105, such as an IPTV-enabled television and a set top box 110 configuration. It is understood that in exemplary embodiments and implementations, the communications device 105 can be a variety of other communications devices such as general purpose or laptop computers, wireless devices such as cellular telephones, portable computing device, digital music players (e.g., MP3 players), mobile devices, or videophones. In addition, a wireline PSTN telephone, SIP telephone, dual-mode mobile telephone, personal digital assistant (PDA), or other type of communications device 105 may be included in the networks/systems 100 of FIG. 1.

The networks/systems 100 can manage multiple accounts as established by particular users. These accounts may then be used to provide access to media services as described further herein. As non-limiting examples, these accounts may provide access to a networked address book. According to exemplary embodiments, the networks/systems 100 also include a remote controller 140 for inputting information and controlling the communications device 105 (e.g., an IPTV).

According to exemplary embodiments, the networks/systems 100 include the communications device 105 as discussed above, which can be a IPTV enabled television communicatively coupled to the set top box 110, which is in turn communicatively coupled to a server 115 for accessing networks 120, 121 such as but not limited to the Internet. The server 115 is exemplary and may be omitted, such that the set top box 110 is directly accessing the networks 120, 121. The networks 120, 121 may include circuit-switched and/or packet-switched technologies and devices, such as routers, switches, hubs, gateways (e.g., residential gateways, including a DSL modem), and/or IMS-based network for facilitating communications between the communications device 105 and a server (e.g., authentication server) 130, storage device 135, a server 150 and/or storage device 155. The networks 120, 121 may include wireline and/or wireless components utilizing, e.g., 802.11 standards for providing over-the-air transmissions of communications. The networks 120, 121 can be IP-based networks for communication between a customer service center and clients using the communication device 105 via a broadband connection.

In accordance with exemplary embodiments, the networks 120 and 121 may be the same, different, or partially overlapping networks, and may have the same or different capabilities. Additionally, the networks 120 and 121 can be representative of countless networks.

According to exemplary embodiments, the networks 120, 121 facilitate transmission of media (e.g., images, video, data, maps, waypoints, multimedia messaging, etc.) from content services provider systems to customers via devices, such as the communications device 105, a mobile device 160, and a communication vehicle device 170, through a broadband connection. As discussed above, the network 121 may or may not be the same as the network 120. If the networks 120 and 121 are different, in exemplary embodiments, the communication vehicle device 170, communication device 105, and mobile device 160 may all be in communication with each other via the network 121. The communication vehicle device 170 may be a mobile device capable of being used in a vehicle 180.

In accordance with exemplary embodiments, the communication vehicle device 170 is operatively connected to a positioning and/or guidance system 175 (e.g., a navigational device which can navigate from one place to another or which can locate a place). Conversely, in exemplary embodiments, the positioning and/or guidance system 175 is operatively connected to the network 121 (or the network 120), and the communication vehicle device 170 may be omitted.

In exemplary embodiments, the networks 120, 121 can be a managed IP network administered by a service provider, which can control bandwidth and quality of service for the communications discussed herein. The networks 120, 121 may be implemented in a wireless fashion, e.g., using wireless protocols and technologies, such as WiFi, WiMax, and Bluetooth. The networks 120, 121 can also be a packet-switched network such as a local area network, wide area network, metropolitan area network, Internet network, or other similar type of network environment. The networks 120, 121 may be a cellular communications network, a fixed wireless network, a wireless local area network (LAN), a wireless wide area network (WAN), a personal area network (PAN), a virtual private network (VPN), an intranet or any other suitable network system, and the networks 120, 121 include equipment for receiving and transmitting signals such as a cell tower and mobile switching center. In another exemplary embodiment, the networks 120, 121 can be a circuit-switched network such as a standard public switched telephone network (PSTN).

As further shown in FIG. 1, a (host) server 125 is in communication with the (authentication) server 130 and the communications device 105 via the network 120. The server 125 may be implemented using a high-speed processing device (e.g., a computer system, etc.) that is capable of handling high volume activities conducted via other network entities. A network service provider, content service provider, media service provider, webpage provider, or other enterprise may represent the server 125. Similarly, the servers 125, 130, 150 may be implemented using a high-speed processing device (e.g., a computer system, etc.) that is capable of handling high volume activities conducted via the network 120. According to exemplary embodiments, the server 130 may receive requests from the mobile device 160 or the communications device 105 either to establish accounts or to access network services (e.g., to access address books).

Furthermore, exemplary embodiments are not limited to but are capable of being implemented in the exemplary networks/systems 100 illustrated in FIG. 1. Additionally, the servers 115, 125, 130, and 150 may be representative of numerous, varied servers. The storage devices 135, 155, and 145 may be representative of numerous, varied storage devices. Likewise, the networks 120 and 121 may be representative of numerous, varied networks and systems. Therefore, the networks/systems 100 illustrated in FIG. 1 are neither limited numerically to the elements depicted therein nor limited to the exact configuration and operative connections of the elements. Further, it is understood by those skilled in the art that elements may be added to, subtracted from, or substituted for the elements described in the networks/systems 100 of FIG. 1.

Figure 2:
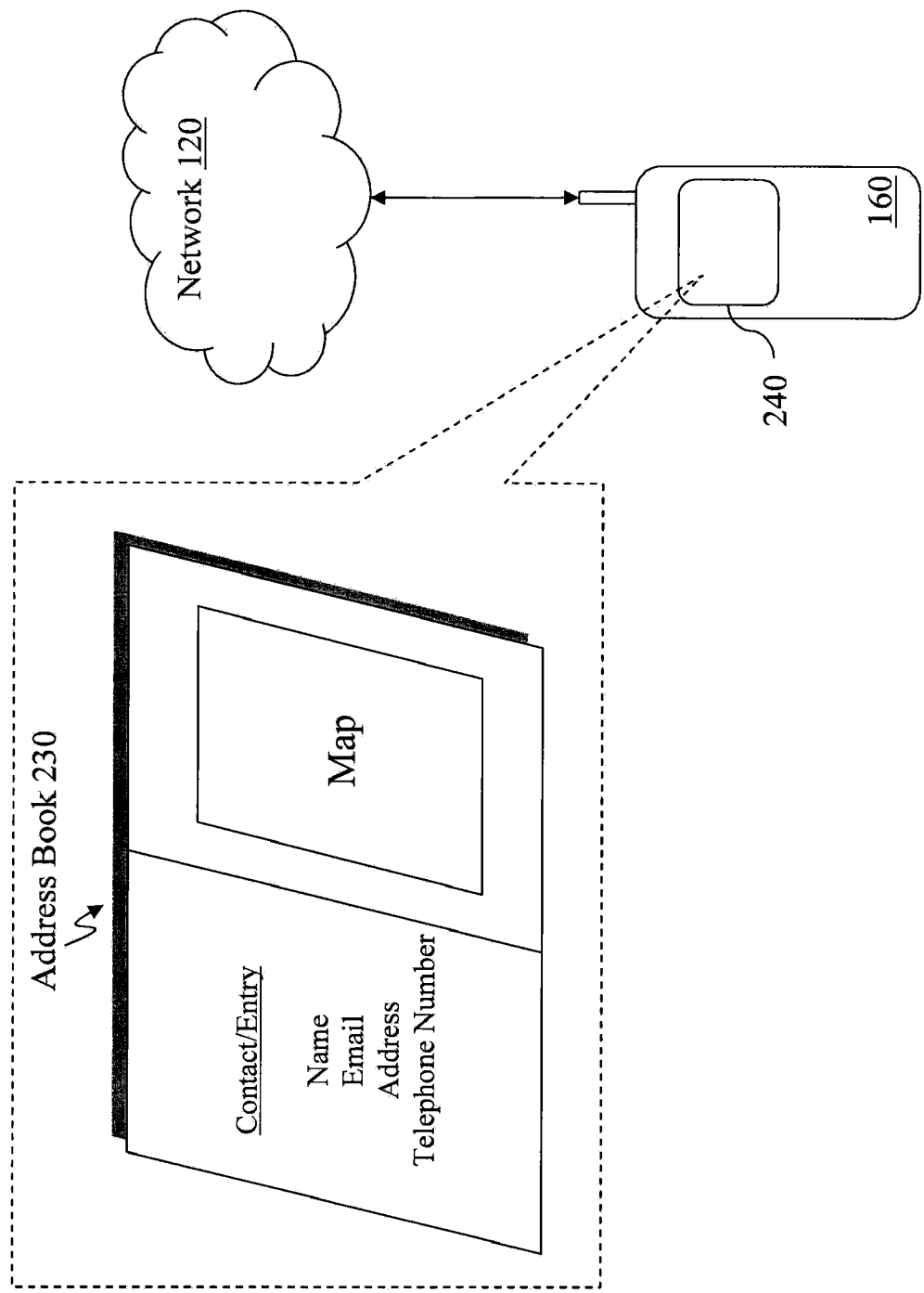
FIG. 2 is a block diagram of an address book having a map component in accordance with exemplary embodiments.

FIG. 2 is a block diagram of an address book having a map component in accordance with exemplary embodiments. The mobile device 160 (also 105 and 170) may be operatively connected to the network 120 (or the network 121). The mobile device 160 may be an IPTV device, a cell phone, PDA, videophone, PC, laptop, etc., and is not meant to be limiting. The network 120 may be a wireless network, a wired network, or a combination of the two.

The mobile device 160 displays an address book 230 on a display screen 240. The address book 230 comprises various information, which corresponds to contacts/entries in the address book 230. In accordance with exemplary embodiments, maps (and directions) are added as components of the address book 230 to correspond with contacts/entries of the address book 230. Instead of just having the name, telephone number, and/or address for a contact/entry in the address book 230, a map component is included. The map component, by way of non-limiting examples, may be added by downloading a map image from a map website and saving/storing the map image in the address book 230. In non-limiting examples, after the map component is initially downloaded from the map website, the map component is not required to be downloaded again from the map website. As non-limiting examples, the map component may be transmitted from another communication device and saved/stored in the address book 230. In further non-limiting examples, the map component may be downloaded from a recording medium, such as an optical storage, electrical storage, mechanical storage, etc. The map component may include a map image and any information related to the location of the contact/entry in the map image.

In exemplary embodiments, the map component may be stored as an image in the address book 230, which may be static or interactive. In exemplary embodiments, the address book 230 may be a networked address book that is stored on a network (e.g., stored on the server 125 and/or storage device 145, such that the networked address may be accessed via the network 120). As non-limiting examples, a provider (e.g., an Internet provider, cable provider, cell phone provider, etc.) supports the networked address book, and the provider maintains adequate storage and memory to support the networked address book having a map component saved/stored therein. As a non-limiting example, the address book 230 may be stored in the mobile device 160.

In exemplary embodiments, the map component is stored/saved in the address book 230, such that the map component is not required to be retrieved from, downloaded from, or linked to a map website (e.g., a map search engine website for looking up addresses on the Internet and displaying a map) when a user desires to access and/or display the map component. As such, the map component may be a static image or an interactive map display. The map component (or address book 230) may have a zoom capability for zooming in and zooming out to enlarge or reduce the size of the map. As non-limiting examples, when a user selects a contact/entry, the map component is displayed along with the name, telephone number, and/or address. As non-limiting examples, when the map component has been saved/stored in the address book 230, to display a map corresponding to a contact/entry, it is not necessary to connect to or access a map website to input an address of the address book 230. As a non-limiting example, the address book 230 may have a field for storing the map component.

Also, in accordance with exemplary embodiments, since a networked address book is supported by the resources of a provider (i.e., the networked address book is saved/stored on the server 125 and/or the storage device 145 on the network 120), a user may desire to utilize a networked address book when the map component is saved/stored in the address book 230, when the map component is interactive, or when local storage capabilities are limited. Since the storage capabilities of a provider appear limitless as compared to local storage on the mobile device 160, a part or the entire address book 230 may be stored on the network 120 (e.g., as a networked address book). As well, a user may choose to save/store map components corresponding to contacts/entries on the network 120, e.g., in a map network storage on the server 125.

Additionally, in exemplary embodiments, the address book 230 may include map links to a map website such that a user may initiate, e.g., click on, the map link, and the map is downloaded from the Internet, e.g., from a map website. The address of the contact/entry stored in the address book 230 is used to retrieve the map from the map website. Conversely, in exemplary embodiments, the map link may be to a map network storage, and when the user clicks on the map link, a saved/stored map component from the map network storage is retrieved without having to connect to a map website. As such, a user may choose to save/store the map component to the map network storage, and accordingly, a map link (that corresponds to the map component in the map network storage) is saved/stored in the address book 230. Moreover, the user may choose to save/store the map component itself (as discussed herein) in the address book 230.

Further, the map component may be optional such that some contacts/entries of the address book 230 have a corresponding map and some do not. Also, the user may have an option of saving/storing a static map component in the address book 230 and/or saving/storing a link to a map component in the address book 230.

In accordance with exemplary embodiments, a user may initiate/acquire the address book 230 with the mobile device 160, and when the user selects a contact/entry, the map may be displayed along with other information (e.g., name, telephone numbers, addresses, etc.) for the contact/entry. In exemplary embodiments, the user has an option of displaying or not displaying the map on the display screen 240, because the user may not want to view the map each time a contact/entry is selected.

In accordance with exemplary embodiments, the map component may be used to generate directions to the location of the corresponding contact/entry. In non-limiting examples, the mobile device 160 has guidance and/or positional capabilities (e.g., GPS capabilities or navigational capabilities), and the map component of the contact/entry may be used as an endpoint (or vice versa) in providing directions to or from the contact/entry. In exemplary embodiments, waypoint information may be associated with the map component to be used in conjunction with the guidance and/or positional capabilities of the mobile device 160, such that waypoint information is used to provide directions to or from the contact/entry.

The address book 230 (e.g., a networked address book) may be accessed and displayed on an IPTV device, such as the communications device 105, (via the set top box 110), and the map component of the networked address book can be displayed, in accordance with exemplary embodiments.

Figure 3:
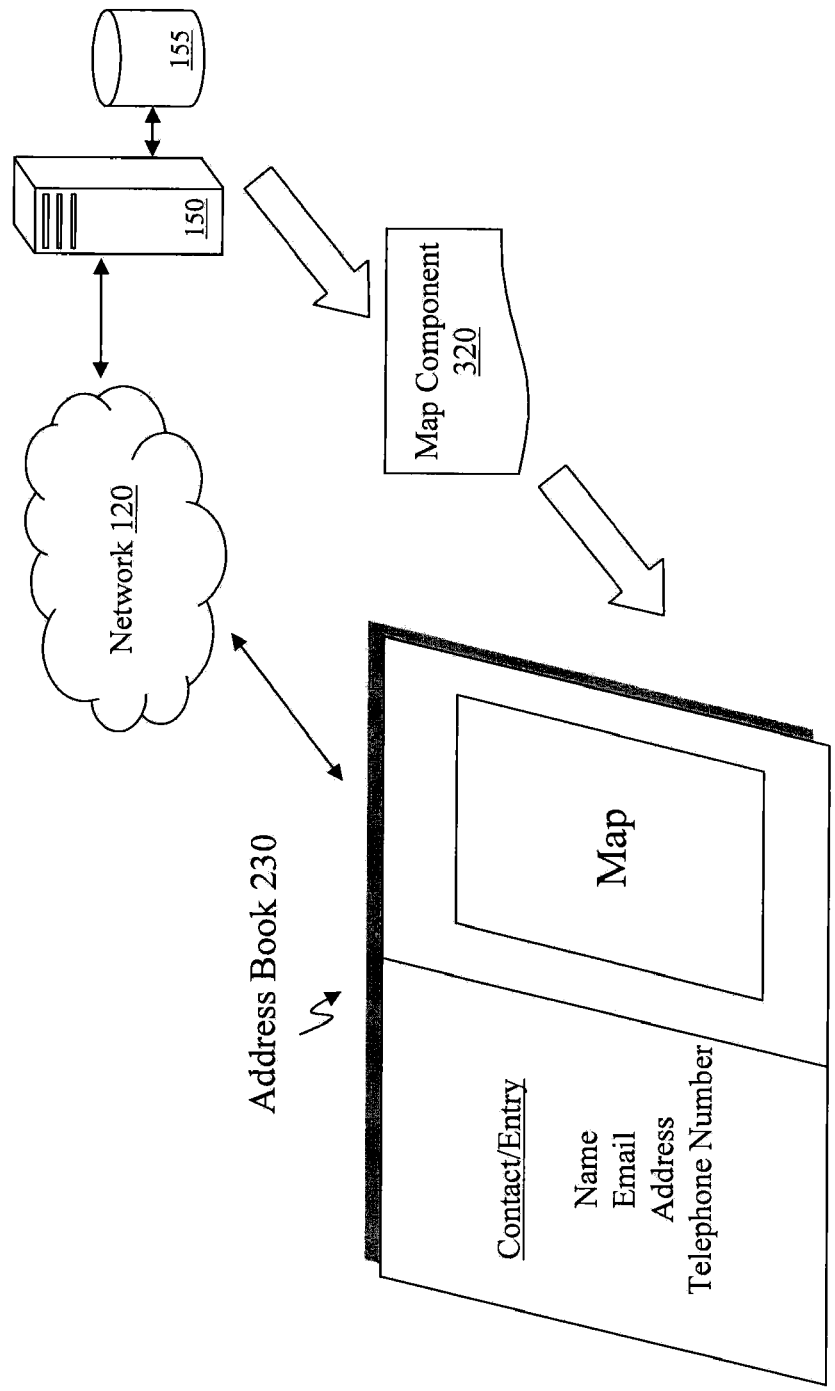
FIG. 3 is a block diagram of adding a map component to an address book in accordance with exemplary embodiments.

FIG. 3 is a block diagram of adding a map component 320 to the address book 230 in accordance with exemplary embodiments. In accordance with exemplary embodiments, the address book 230 receives the map component 320 to be included in the address book 230 via the network 120 (and/or 121). As a non-limiting example, the mobile device 160 may communicate with the server 150 (and/or the storage device 155) to access the map component 320.

Using the mobile device 160, the map component 320 corresponding to a contact/entry may be saved/stored in the address book 230 along with other information such as the name, address, and/or telephone for the contact/entry. The map component 320 may be saved/stored as a static image, as an interactive map display, and/or as a map link in the address book 230. In accordance with exemplary embodiments, the map link may be to a map network storage that is saved/stored on the network 120 (e.g., on the server 150 and the storage device 155), to a map website on the Internet, and/or to a map component file within the address book 230.

In accordance with exemplary embodiments, to initially add the map component 320 to the address book 230, the map component 320 may be downloaded from a map website (e.g., a map website that uses an address to generate a map for a particular location) or from a map network storage. Also, the map component 320 may be downloaded from an optical storage device, electrical storage device, mechanical storage device, satellite system, cable system, cellular system, and wireless system. After the map component 320 is retrieved and stored/saved to the address book 230, the map component 320 may no longer require retrieval from, e.g., a map website. In accordance with exemplary embodiments, if the map component 320 is stored/saved in the address book 230 as a static image or interactive map display, the address book 230 may be considered a stand-alone collection of information for a contact/entry. Also, in exemplary embodiments, a map link, to a map component file within the address book 230, allows the address book 230 to be considered a stand-alone collection of information that does not require a connection to a map website to view and/or display the map on a device (e.g., the devices 105, 160, and 170).

Figure 4:
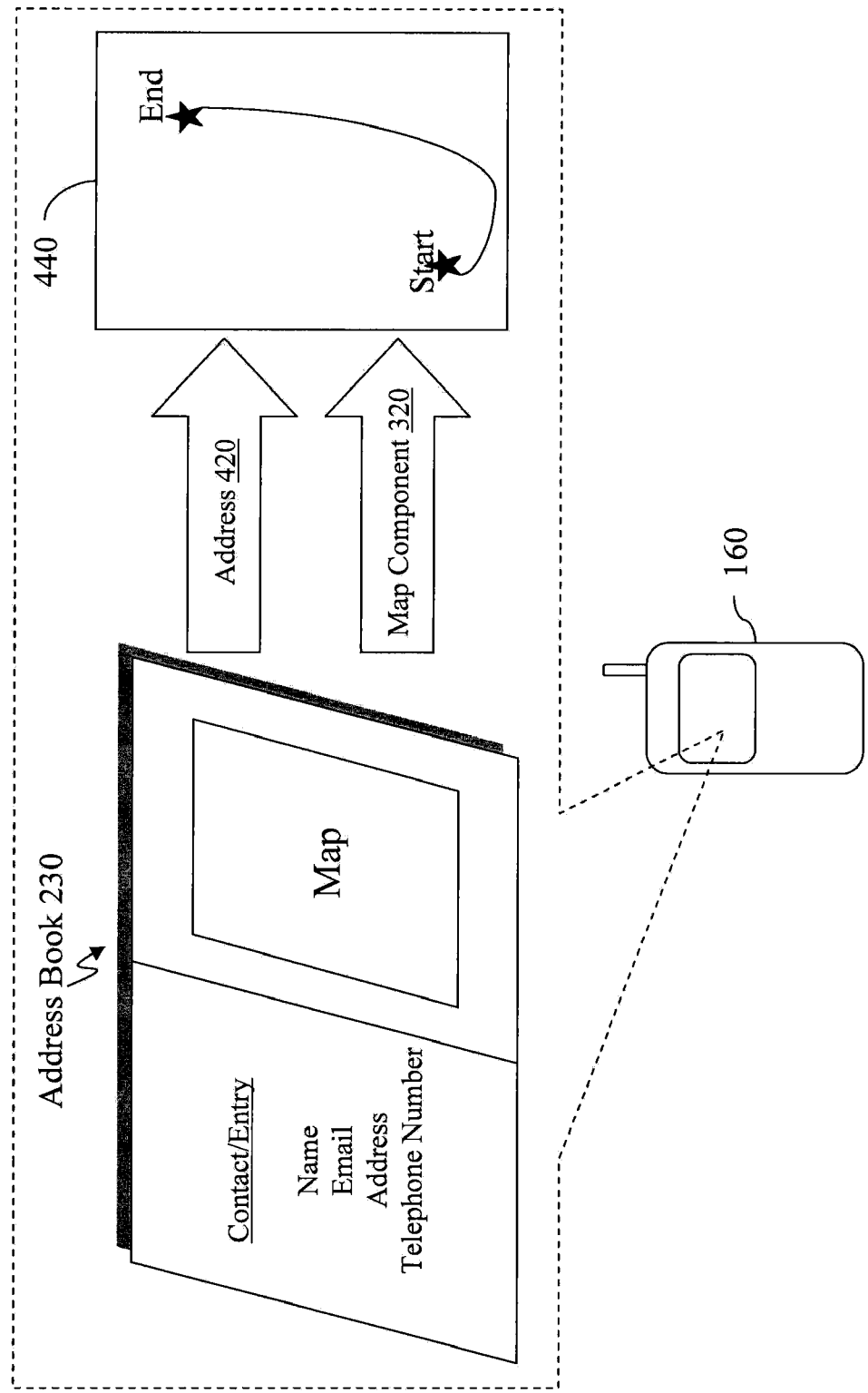
FIG. 4 is a block diagram of using a map component and/or address of an address book to generate directions in accordance with exemplary embodiments.

FIG. 4 is a block diagram of using the map component 320 and/or an address 420 of the address book 230 to generate directions in accordance with exemplary embodiments. The address book 230 may contain the address 420 and/or the map component 320. The address 420 and map component 320 may be extracted from the address book 230 and used as an endpoint (or start point) to navigate and/or generate directions to the corresponding contact/entry.

In accordance with exemplary embodiments, the mobile device 160 may be configured to operate as a guidance system, a navigation system, and/or a positional/location system. The address book 230 may be displayed on the mobile device 160, and the mobile device 160 extracts (or the address book 230 transfers) the address 420 and/or the map component 320, according to exemplary embodiments. The address 420 and/or map component 320 is used by the mobile device 160 in generating directions or generating maps with a start point and endpoint shown in block 440.

In accordance with exemplary embodiments, the map component 320 may include waypoint information and/or directional information compatible with or in an acceptable standard to the format for a guidance system, a navigation system, and/or a positional/location system of the mobile device 160.

Figure 5:
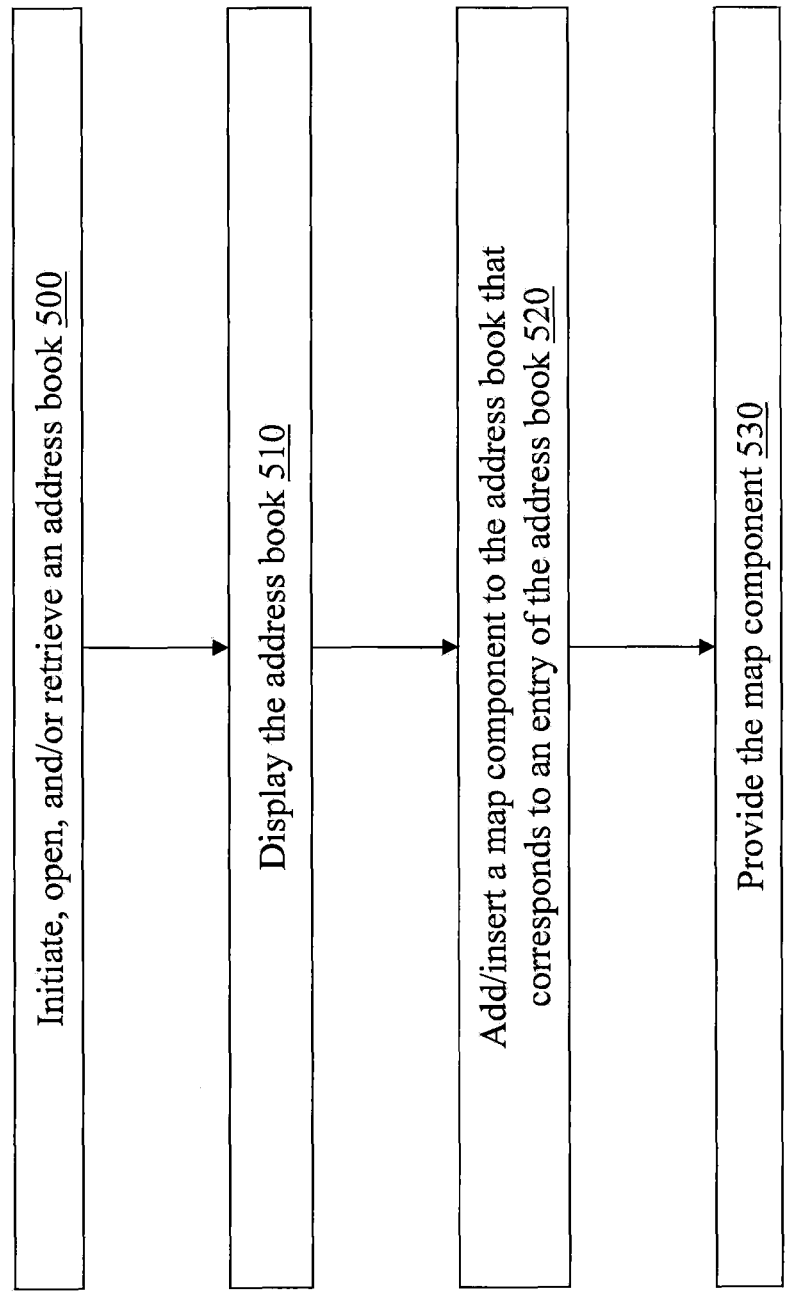
FIG. 5 is a flow chart of adding a map component to an address book in accordance with exemplary embodiments.

FIG. 5 is a flow chart of adding a map component, such as the map component 320, to an address book, such as the address book 230, in accordance with exemplary embodiments. The address book 230 is initiated, opened, and/or started by the mobile device 160 at 500. The address book 230 is displayed on the mobile device 160 at 510. The map component 320 is added by the mobile device 160 to the address book 230 that corresponds to an existing entry of the address book 230 or to a new entry of the address book 230 at 520. The map component 320 stored in the address book 230 is displayed on a device, such as the mobile device 160, at 530.

The operations of the flow chart may also include storing/saving the map component 320 in the address book 230. In accordance with exemplary embodiments, if an entry of the address book 230 is selected, the map component 320 may be displayed when other entry information is displayed.

When initiating the address book 230, the address book 230 may be retrieved from a network, such as the networks 120, 121, in accordance with exemplary embodiments. The address book 230 may be a networked address book that is supported by a network provider, and the map component 320 may be stored in the networked address book, in accordance with exemplary embodiments. In exemplary embodiments, the address book 230 (e.g., as a networked address book) may be stored in the server 125 and/or the storage device 145, and the address book 230 may be retrieved by the mobile device 160 from the server 145 and/or the storage device 145.

Further, in exemplary embodiments, a map link may be initiated (e.g., clicked on) to display the map component 320. The map link may be to a map network storage (e.g., the server 155) that stores the map component 320 for display when the entry of the address book 230 is selected. In exemplary embodiments, the map link may be to a map website on the Internet for generating maps. The map link may be to a map component file that stores map components in the address book 230 in accordance with exemplary embodiments.

The map component 320 may include a static map image and an interactive map image, and the static map image and interactive map image can be enlarged and reduced in display size. Additionally, the map component 320 may include waypoint information, corresponding to an entry in the address book 230, which is extracted and transmitted to a device, such as the mobile device 160, having guidance or positioning capabilities. Also, in exemplary embodiments, an address from the address book 230 may be provided to the map website for generating maps.

Moreover, in exemplary embodiments, displaying the map component 320 may include accessing the map component stored in the address book 230 and may not include accessing a map website over the Internet.

Communication devices, networks, systems, Internet devices, PCs, PDAs, mobile devices, communication vehicle devices, servers, set top boxes, IPTV devices, guidance systems, navigational devices, positioning/location systems, etc., comprise all the hardware, software, modules, applications, and interfaces necessary to operate and function as described herein.

Figure 6:
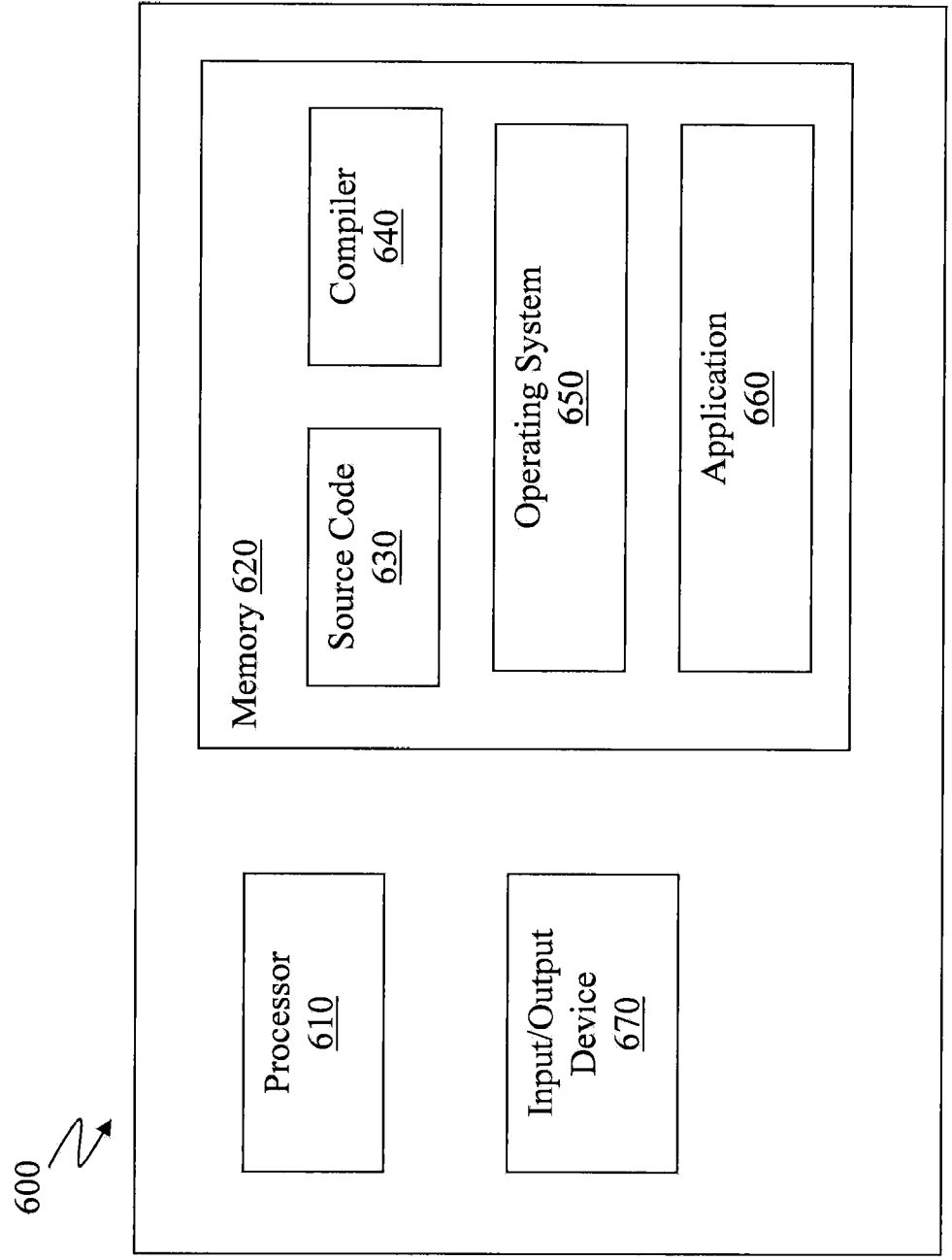
FIG. 6 illustrates an example of a computer having capabilities, which may be included in exemplary embodiments.

FIG. 6 illustrates an example of a computer 600 having capabilities, which may be included in exemplary embodiments. Various processes discussed above may also utilize the capabilities of the computer 600. One or more of the capabilities of the computer 600 may be incorporated in the mobile device 160, the communication device 105, the communication vehicle device 170, the servers 115, 125, 130, 150, and/or any elements discussed herein.

The computer 600 includes, but is not limited to, PCs, workstations, positional and/or guidance devices, laptops, PDAs, palm devices, Internet protocol enabled televisions, set top boxes, servers, and the like. Generally, in terms of hardware architecture, the computer 600 may include one or more processors 610, memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and an application 660 (which may be one or more applications) of the exemplary embodiments. As illustrated, the application 660 comprises numerous functional components for implementing the features and operations of the exemplary embodiments.

The operating system 650 essentially controls the execution of other computer programs, and provides scheduling, input-output control, file and data management, memory management, and communication control and related services. It is contemplated by the inventor that the application 660 for implementing exemplary embodiments is applicable on commercially available operating systems.

The application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to, a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such at the Internet, and the networks 120, 121.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 600 includes non-limiting examples of software and hardware components that may be included in various devices and systems discussed herein, and it is understood that additional software and hardware components may be included in the various devices and systems discussed in exemplary embodiments.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method on a mobile device of adding a map image to an address book, comprising:

initiating on the mobile device a networked address book, the networked address book being obtained from a network storage on a network;

adding the map image to be stored in the networked address book that corresponds to an entry of the networked address book;

storing the map image itself in the networked address book in the entry along with a contact name, a telephone number, and an address in the entry, the networked address book comprising the contact name, the telephone number, the address, and the map image itself in the entry;

displaying the map image stored in the networked address book on the mobile device, responsive to a user selecting the entry in the networked address book to display the contact name, the telephone number, and the address;

providing options for the user to save the map image in the networked address book as a static map image, an interactive map image, and a map link to the map image;

wherein the map image in the networked address book is operative to be accessed and displayed on a television via a set top box;

wherein the mobile device is an internet protocol television device; and providing an option to display and to not display the map image for each time the contact name is selected, the mobile device comprising guidance and navigational capabilities to provide directions to and from the contact name via the map image.

2. The method of claim 1, wherein the networked address book is supported by a network provider.

3. The method of claim 1, wherein the map link is initiated to display the map image.

4. The method of claim 3, wherein the map link is to a map network storage that stores the map image for display when the entry of the networked address book is selected.

5. The method of claim 4, wherein the address from the networked address book is provided to a map website for generating the map image.

6. The method of claim 1, wherein the interactive map image stored in the networked address book is operative to be enlarged and reduced in display size.

7. The method of claim 1, wherein the map image comprises waypoint information.

8. The method of claim 1, wherein displaying the map image on the mobile device comprises accessing the map image stored in the networked address book without accessing a map website over an internet.

9. A system of a mobile device for adding a map image, the system comprising:
an input and output device for respectively receiving and transmitting communications over a network;
a display screen;
memory comprising computer-executable instructions;
a processor executing the computer-executable instructions, the computer-executable instructions, when executed by the processor, cause the processor to perform operation comprising:
initiating a networked address book, the networked address book being obtained from a network storage on the network;
displaying the networked address book on the display screen;
adding the map image to be stored in the networked address book such that the map image corresponds to an entry of the networked address book;
storing the map image itself in the networked address book in the entry along with a contact name, a telephone number, and an address in the entry, the networked address book comprising the contact name, the telephone number, and the map image itself in the entry;
providing options for a user to save the map image in the networked address book as a static map image, an interactive map image, and a map link to the map image;
wherein the map image in the networked address book is operative to be accessed and displayed on a television via a set top box;
wherein the mobile device is an internet protocol television device, and;
providing an option to display and to not display the map image for each time the contact name is selected, the mobile device comprising guidance and navigational capabilities to provide directions to and from the contact name via the map image.

10. A computer program product, tangible embodied on a non-transitory computer readable medium, for adding a map image to a networked address book, the computer program product including instructions, that when executed by a computer, cause the computer to perform operations comprising:
initiating by a mobile device the networked address book, the networked address book being obtained from a network storage on a network;
adding the map image to the networked address book that corresponds to an entry in the networked address book;
storing the map image itself in the networked address book in the entry along with a contact name, a telephone number, and an address in the entry, the networked address book comprising the contact name, the telephone number, and the map image itself in the entry;
providing options for a user to save the map image in the networked address book as a static image, an interactive image, and a map link to the map image;
wherein the networked address book is supported by a network provider and the map image is stored in the networked address book of the network provider;
wherein the map link is initiated to display the map image, and;
wherein the interactive map image stored in the networked address book is operative to be enlarged and reduced in display size, and;
displaying the map image on the mobile device comprises accessing the map image stored in the networked address book without accessing a map website over an internet;
wherein the map image in the networked address book is operative to be accessed and displayed on a television via a set top box;
wherein the mobile device is an internet protocol device, and;
providing an option to display and to not display the map image for each time the contact name is selected, the mobile device comprising guidance and navigational capabilities to provide directions to and from the contact name via the map image.

\* \* \* \* \*